Figure 1:
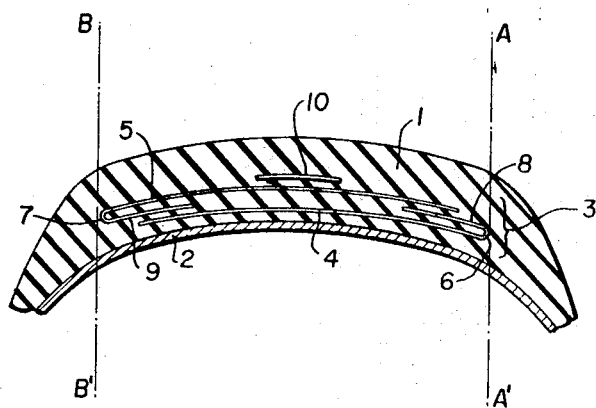

United States Patent

[11] 3,623,529

[72] Inventor Fulcieri Fausti
Monza, Italy
[21] Appl. No. 889,257
[22] Filed Dec. 30, 1969
[45] Patented Nov. 30, 1971
[73] Assignee Pirelli, S.p.A.
Milan, Italy
[32] Priority Jan. 4, 1969
[33] Italy
[31] 11174A/69

[54] BREAKER STRUCTURES OF RADIAL TIRES
5 Claims, 2 Drawing Figs.

[52] U.S. Cl. ................................................ 152/361
[51] Int. Cl. ................................................ B60c 9/20
[50] Field of Search .................................... 152/361

[56] References Cited
UNITED STATES PATENTS
2,996,097 8/1961 Lugli .......................... 152/361
3,002,546 10/1961 Limmer ...................... 152/361

Primary Examiner—Arthur L. La Point
Assistant Examiner—Robert Saifer
Attorney—Stevens, Davis, Miller & Mosher ABSTRACT: The disclosure relates to an invention in a pneumatic tire for a vehicle which tire has a radial carcass and a tread provided with a breaker structure. The breaker structure comprises a plurality of radially disposed strips formed of cords disposed at various angles relative to the midcircumferential plane of the tire. The breaker strips are arranged and folded relative to each other to produce such stiffness as to cause substantially absolute adherence of the tire to the travelling surface at low or high ground speeds.

INVENTOR
FULCIERI FAUSTI

BY Stevens, Davis, Miller & Mosher

ATTORNEY

BREAKER STRUCTURES OF RADIAL TIRES

The present invention relates to the so-called "radial tires," namely, to tires provided with a carcass formed by cords lying in radial planes or forming small angles with said planes, and concerns in particular the breaker structures of radial tires intended to travel at high speed.

The background of the invention establishes that radial tires can be provided with an annular breaker structure, disposed between the carcass and the tread to stiffen the tread. This structure, which in the present specification will simply be called "breaker," has an important effect on the tire behavior, according to its structure and its geometrical arrangement (namely the angular relationships between the cords constituting it). It is also known that, in particular for tires intended to run at high speed, it is preferable to provide a tread as flat as possible so as to provide a large surface in contact with the ground and to ensure consequently a high adherence of the tire to the latter.

This is generally obtained by using as a breaker a very rigid structure, for instance one constituted by strips of cord fabric of metallic material, disposed at a very low angle with respect to the longitudinal direction of the tire, in order to reduce displacements of the cords existing in the central portion of the structure itself, which cause deformation of the curved path in the zone of the tread. While such a construction may ensure in any condition of operation the desired flattening degree on the tread profile in the central portion of the tread (which flattening degree is determined by the requirements of a good comfort and of steerability of the vehicle), nevertheless does not produce an analogous effect in the tread lateral portions.

It was in fact noticed that, at high speed, the tread profile tends to deformate, curving in such a way as to show a concavity towards the ground, due to the poor belting effect of the lateral edges of the breaker, with a consequent reduction in the adherence to the ground, and therefore in the road holding and steering safety.

The present invention aims at providing a pneumatic tire having very good road holding and driving safety at high speed, together with a high softness and a quite good travelling comfort even at normal speed.

Briefly summarized the invention comprises a radial carcass and a tread and is provided with a breaker structure disposed between the carcass and the tread. The breaker structure comprising two strips of cord fabric of metallic material folded in such a way as to form two skirtings, the folding lines of the two strips facing the two tread corners and constituting the edges of the breaker, and the cords of one strip being crossed with respect to those of the adjacent strip. The tire is characterized in that in the breaker structure the two strips are folded in such a way that the two skirtings have respectively a width ranging between 75 and 95 percent and between 15 and 35 percent of the width of the breaker, and in that an additional strip of cord fabric of metallic material is provided, which is superimposed relative to the folded strips and is less than or equal to the distance between the skirtings of smaller width of said strips, the cords of the folded strips being symmetrically inclined with respect to the longitudinal direction by an angle between 15° and 30°, and the cords of the additional strip being inclined, with respect to said direction, by an angle between 10° and 20°, preferably of opposite sign with respect to the angle of the immediately underlying folded strip.

Preferably, the two folded strips of breaker structure according to the present invention are arranged in such a way that the skirting of smaller width of the innermost strip is directed towards the tire outside, whereas the corresponding skirting of the other strip is directed towards the inside.

The additional strip superimposed relative to the folded strips is preferably of a width equal to 45 percent of the distance between the skirtings of smaller width of the folded strips.

The breaker structure according to the present invention proves to be particularly advantageous. In fact, although in the folded strips the cords are inclined at a somewhat high angle, these strips provide a structure of the stiffness necessary to provide the absolute adherence of the tire to the ground both at low and at high speed, by virtue of the presence of the skirtings of smaller width. These skirtings, although they are present only at the edges of the breaker structure, reinforce this structure in the zones where a stiffening is chiefly required, since their cords are arranged along a direction opposite to that of the cords of the skirtings of greater width belonging to the respective strips. The central part of the breaker is instead made lighter, with an evident positive influence on the travelling comfort of the tire at low speed, by virtue of the arrangement of the cords and of the reduction in the number of the strips.

The provision of the narrow outermost additional strip arranged in the central portion of the breaker structure at a very small angle with respect to the longitudinal direction, is on the other hand, sufficient to prevent the movement of the cords of the underlying strips in this portion during the travel of the tire at high speed, avoiding therefore a deformation of the tread; moreover, owing to the limited width of this strip its presence does not originate a serious negative influence on the softness of the whole structure.

Figure 2:
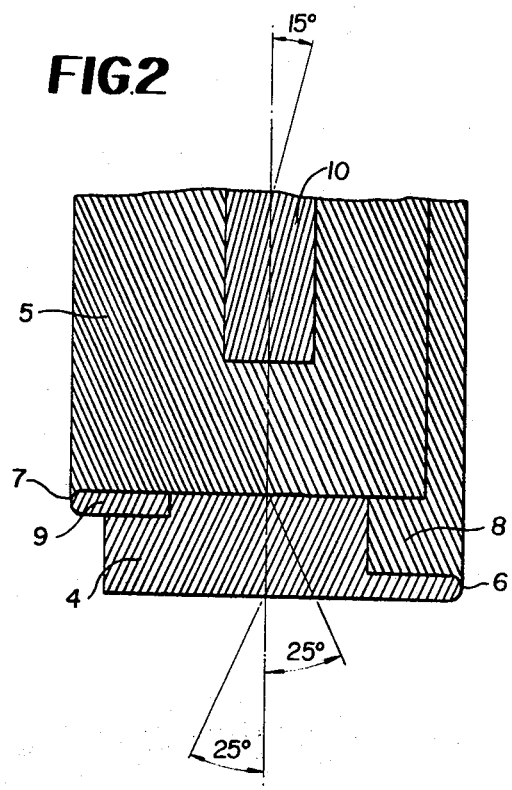

The present invention will be more clearly understood from the following detailed description, made with reference to the accompanying drawings given by way of nonlimiting example, in which:

FIG. 1, depicts diagrammatically in section, the tread portion of a tire according to the present invention; and FIG. 2, shows in plan view the breaker structure of the tire illustrated in FIG. 1, in which some parts are broken away to show the path of the cords.

In FIG. 1, the tire comprises a tread 1 and a carcass 2 formed by cords lying in radial planes. A breaker 3 is inserted between the tread and the carcass. This breaker comprises a first strip 4 of metallic material, folded along a folding line 6, said line being disposed at one of the edges of the breaker defined by the plane indicated with line A–A', in such a way as to form a skirting 8 having a width equal to about 25 percent of the width of the whole breaker.

The breaker 3 comprises moreover a second strip 5 of metallic material, folded like strip 4 to form a skirting 9 equal to the skirting 8 along the folding line 7, which latter is disposed at the edge of the breaker defined by the plane indicated with line B–B'.

The cords of the larger skirtings of the strips 4 and 5 are parallel to one another and are inclined at an angle of 25°, equal and symmetrical with respect to the longitudinal direction.

A strip 10 of metallic material is disposed above the strip 5 and is arranged at the central portion of the breaker and has a width corresponding to 45 percent of the distance comprised between the two skirtings of smaller width of the underlying strips. The cords of the additional strip are inclined, with respect to the longitudinal direction, by an angle of 15°, and said inclination has a sense opposite to that of the cords of the underlying strip, so that the crossing angle between the cords of these strips is 40°.

It should be understood that the present invention is not limited to the above illustrated examples, but that it includes any other alternative embodiments deriving from the above-indicated inventive principle.

What is claimed is:

1. A pneumatic tire for vehicle wheels, comprising a radial carcass and a tread and having a breaker structure disposed between said carcass and said tread, said breaker structure comprising at least two strips of cord fabric of metallic material folded in such a way as to form two skirtings, the folding lines of said strips facing one of the tread corners and constituting the edges of the breaker, and the cords of one strip being crossed with respect to those of the adjacent strip, characterized in that in the breaker structure the two strips are folded in such a way that said skirtings have respectively a width ranging between 75 and 95 percent and between 15 and 35 percent of the width of the breaker, and in that an additional strip of cord fabric of metallic material is provided, which is superimposed to the folded strips and is of a width less than or equal to the distance between the skirtings of smaller width of said strips, the cords of the folded strips being symmetrically inclined, with respect to the longitudinal direction, by an angle between 15° and 30°, and the cords of the additional strip being inclined, with respect to said direction, by an angle between 10° and 20°, preferably of opposite sign with respect to the angle of the immediately underlying folded strip.

2. A pneumatic tire as in claim 1, characterized in that the folded strips are arranged in such a way that the skirting of smaller width of the innermost strip is directed towards the tire outside, and the corresponding skirting of the other strip is directed towards the inside.

3. A pneumatic tire as in claim 1 characterized in that the additional strip is of a width substantially equal to 45 percent of the distance comprised between the skirtings of smaller width of said folded strips.

4. A tire for vehicles including a radial carcass and tread, a breaker structure disposed between the carcass and tread, said breaker structure comprising a plurality of radially spaced strips formed of cords angularly disposed relative to the mid-circumferential plane of the tire, lateral edge portions of said breaker strips being folded relative to each other to produce stiffness in the tire to cause substantially complete adherence of the tire to the travelling surface at various ground speeds, said lateral portions of said strips being folded to form skirtings, the folding lines of said strips facing one of the tread corners and constituting the edges of the breaker, and the cords of one strip being crossed with respect to those of the adjacent strip, characterized in that in the breaker structure the two strips are folded in such a way that said skirtings have respectively a width ranging between 75 and 95 percent and between 15 and 35 percent of the width of the breaker, and in that an additional strip of cord fabric of metallic material is provided, which is superimposed to the folded strips and is of a width not greater than the distance between the skirtings of smaller width of said strips, the cords of the folded strips being symmetrically inclined, with respect to the longitudinal direction, by an angle between 15° and 30°, and the cords of the additional strip being inclined, with respect to said direction, by an angle between 10° and 20°, preferably of opposite sign with respect to the angle of the immediately underlying folded strip.

5. A pneumatic tire as in claim 4, characterized in that the additional strip is of a width substantially equal to 45 percent of the distance comprised between the skirtings of smaller width of said folded strips.

* * * * *